(12) United States Patent
Takeshima et al.

(10) Patent No.: US 8,999,878 B2
(45) Date of Patent: Apr. 7, 2015

(54) EXHAUST GAS PURIFYING CATALYST

(75) Inventors: Shinichi Takeshima, Numazu (JP);
Akio Koyama, Yokohama (JP)

(73) Assignee: Toyota Jidosha Kabushiki Kaisha,
Toyota-shi, Aichi (JP)

( * ) Notice: Subject to any disclaimer, the term of this patent is extended or adjusted under 35 U.S.C. 154(b) by 247 days.

(21) Appl. No.: 12/307,131

(22) PCT Filed: Jul. 3, 2007

(86) PCT No.: PCT/JP2007/063625
§ 371 (c)(1),
(2), (4) Date: Dec. 31, 2008

(87) PCT Pub. No.: WO2008/004687
PCT Pub. Date: Jan. 10, 2008

(65) Prior Publication Data
US 2009/0286677 A1    Nov. 19, 2009

(30) Foreign Application Priority Data

Jul. 3, 2006   (JP) ................................ 2006-183474

(51) Int. Cl.
*B01J 21/08*    (2006.01)
*B01J 35/10*    (2006.01)
(Continued)

(52) U.S. Cl.
CPC .............. *B01J 35/10* (2013.01); *B01D 53/945* (2013.01); *B01J 23/002* (2013.01); *B01J 23/83* (2013.01); *B01J 29/0333* (2013.01);
(Continued)

(58) Field of Classification Search
CPC ............ B01D 53/945; B01D 2255/30; B01D 2255/402; B01J 23/002; B01J 23/83; B01J 29/0333; B01J 35/108; B01J 35/109; B01J 2523/3706; B01J 2523/842
USPC ......... 502/100, 232, 240, 300, 302, 304, 305, 502/349, 350
IPC . B01J 35/04, 29/35, 35/10, 23/76, 23/89; B01D 53/86, 53/94; F01N 3/10, 3/28
See application file for complete search history.

(56) References Cited

U.S. PATENT DOCUMENTS 5,380,692 A * 1/1995 Nakatsuji et al. ............. 502/303
5,853,679 A * 12/1998 Tabata ....................... 423/213.2
(Continued)

FOREIGN PATENT DOCUMENTS

EP         1 118 375         7/2001
EP         1 495 802         1/2005
(Continued)

OTHER PUBLICATIONS

Machine translation of Komatsu et al. (JP2006-081957).*
(Continued)

*Primary Examiner* — Jun Li
(74) *Attorney, Agent, or Firm* — Finnegan, Henderson, Farabow, Garrett & Dunner, LLP

(57) ABSTRACT

According to the present invention, an exhaust gas purifying catalyst is provided. The catalyst comprises a porous silica support comprising silica having a pore structure, and a perovskite-type composite metal oxide particle supported in the pore structure of the porous silica support. Further, the peak attributable to the space between silica primary particles is in the range of 3 to 100 nm in the pore distribution of the porous silica support.

9 Claims, 3 Drawing Sheets

(51) Int. Cl.
  *B01D 53/94* (2006.01)
  *B01J 23/00* (2006.01)
  *B01J 23/83* (2006.01)
  *B01J 29/03* (2006.01)
  *B01J 37/02* (2006.01)

(52) U.S. Cl.
  CPC ...... *B01D 2255/30* (2013.01); *B01D 2255/402* (2013.01); *B01J 35/1019* (2013.01); *B01J 35/1023* (2013.01); *B01J 35/108* (2013.01); *B01J 35/109* (2013.01); *B01J 37/0203* (2013.01); *B01J 37/0242* (2013.01); *Y02T 10/22* (2013.01)

(56) References Cited

U.S. PATENT DOCUMENTS

| | | | | |
|---|---|---|---|---|
| 6,030,590 | A | * | 2/2000 | Tabata et al. ............... 423/239.1 |
| 2001/0053467 | A1 | | 12/2001 | Kaneko et al. |
| 2003/0171217 | A1 | * | 9/2003 | Koike et al. .................. 502/439 |
| 2005/0020699 | A1 | * | 1/2005 | Isobe et al. ...................... 516/33 |

FOREIGN PATENT DOCUMENTS

| | | |
|---|---|---|
| JP | 61-11146 | 1/1986 |
| JP | 3-296438 | 12/1991 |
| JP | 4-122447 | 4/1992 |
| JP | 7-80310 | 3/1995 |
| JP | 8-229404 | 9/1996 |
| JP | 10-72212 | 3/1998 |
| JP | 10-182144 | 7/1998 |
| JP | 2000-24503 | 1/2000 |
| JP | 2000-24516 | 1/2000 |
| JP | 2003-181282 | 7/2003 |
| JP | 2005-66559 | 3/2005 |
| JP | 2006-7023 | 1/2006 |
| JP | 2006-81957 | 3/2006 |

OTHER PUBLICATIONS

Machine translation of Matsui et al (JP07-080310).*
Sen et al., "Meso-cellular silica foams, macro-cellular silica foams and mesoporous solids: a study of emulsion-mediated synthesis," *Microporous and Mesoporous Materials*, v. 78, pp. 255-263 (2005).
Extended European Search Report for EP Appl. No. 07768349.8-1270 dated Feb. 10, 2011.

* cited by examiner

EXHAUST GAS PURIFYING CATALYST

CROSS-REFERENCE TO RELATED APPLICATIONS

This application is a national phase application of International Application No. PCT/JP2007/063625, filed Jul. 3, 2007, and claims the priority of Japanese Application No. 2006-183474, filed Jul. 3, 2006, the contents of both of which are incorporated herein by reference.

TECHNICAL FIELD

The present invention relates to an exhaust gas purifying catalyst. More specifically, the present invention relates to an exhaust gas purifying catalyst for purifying automobile exhaust gas.

BACKGROUND ART

Exhaust gas from an internal combustion engine, such as an automobile engine, contains nitrogen oxide ($NO_x$), carbon monoxide (CO), hydrocarbon (HC) and the like. These substances can be purified by an exhaust gas purifying catalyst capable of oxidizing CO and HC and at the same time, reducing $NO_x$. As a representative exhaust gas purifying catalyst, it is known to use a three-way catalyst comprising a porous metal oxide support, such as γ-alumina and a noble metal, such as platinum (Pt), rhodium (Rh) and palladium (Pd) supported thereon.

However, such a noble metal is expensive, and may be in short supply in the future due to a reduction in reserves. Accordingly, it is proposed to use, as a catalyst for purifying an exhaust gas, a perovskite-type composite metal oxide, which is a catalyst other than a noble metal.

In this regard, for example, Japanese Unexamined Patent Publication No. 8-229404 discloses using a mixture of a catalyst component containing a noble metal and a catalyst component which is a perovskite-type composite metal oxide having a chemical formula $ABO_3$ (wherein A is selected from the group consisting of lanthanum La, strontium Sr, cerium Ce, barium Ba, calcium Ca and a combination thereof; B is selected from the group consisting of cobalt Co, iron Fe, nickel Ni, chromium Cr, manganese Mn, magnesium Mg and a combination thereof; and O is oxygen). Japanese Unexamined Patent Publication No. 8-229404 describes that the perovskite-type composite metal oxide allows a particulate carbon substance and/or a hydrocarbon to burn from a low temperature region, and promotes oxidation from NO to $NO_2$, which is then temporarily absorbed as $NO_x$.

Japanese Unexamined Patent Publication No. 8-229404 above teaches that the perovskite-type composite metal oxide can be produced by a first step of preparing an aqueous solution comprising dissolved salts of metals constituting the perovskite-type composite metal oxide and a citric acid, a second step of drying the obtained aqueous solution to form a citric acid complex of the metals, a third step of heating/preliminarily firing the citric acid complex at 350° C. or more in a vacuum or inert gas atmosphere, and then a fourth step of firing the heated/preliminarily fired precursor in an oxidative atmosphere.

The porous metal oxide support for loading a catalyst component thereon is not limited only to aluminum, but use of porous silica is also proposed.

For example, Japanese Unexamined Patent Publication No. 2000-24503 proposes an exhaust gas purifying catalyst, wherein the support is a porous silica body having only mesopores of 1 to 5 nm in diameter as the pore, and a noble metal is supported at least in the mesopore. Japanese Unexamined Patent Publication No. 2000-24503 describes that in such an exhaust gas purifying catalyst, the noble metal supported in the mesopore does not readily migrate, and therefore grain growth during an endurance test is suppressed.

Japanese Unexamined Patent Publication No. 2000-24516 proposes an exhaust gas purifying catalyst obtained by loading a noble metal on a support comprising a porous silica body having mesopores of 4 nm or less, wherein a noble metal such as platinum and a metal oxide having an oxygen storing-releasing ability, such as ceria, are supported in the mesopore. Japanese Unexamined Patent Publication No. 2000-24516 states that, in such an exhaust gas purifying catalyst, the noble metal and metal oxide can hardly migrate from the mesopore and are restricted in movement. Therefore, since they are prevented from grain growth into a size larger than the diameter of the mesopore, the highly dispersed state of the noble metal and metal oxide is maintained even after an endurance test.

Incidentally, as the production method of the porous silica, various production methods are known.

For example, Japanese Unexamined Patent Publication No. 2003-181282 above proposes a novel production method of a porous silica used as an adsorbent, the porous silica having a large specific surface area and uniform-size mesopores. In the production method of Japanese Unexamined Patent Publication No. 2003-181282 above, the porous silica is produced by removing alkylamines from an organic-inorganic composite comprising a polycondensate of alkoxysilanes and a micelle-forming alkylamine.

As described in Japanese Unexamined Patent Publication No. 8-229404, in the field of an exhaust gas purifying catalyst, it is known to use a perovskite-type composite metal oxide as the catalyst component. The perovskite-type composite metal oxide used in the field of an exhaust gas purifying catalyst is generally produced by co-precipitating a precursor of the perovskite-type composite metal oxide from a solution containing a salt of a metal constituting the perovskite-type composite metal oxide, and then drying and firing the precursor.

It is known that, with regard to low-temperature catalytic activity, such a perovskite-type composite metal oxide known provides a performance comparable to a noble metal catalyst or better than a noble metal catalyst. However, in terms of the maximum $NO_x$ purification percentage, i.e., the $NO_x$ purification percentage at high temperatures, good results are necessarily provided.

In the case of obtaining a perovskite-type composite metal oxide by a co-precipitation method as above, the obtained perovskite-type composite metal oxide particle sometimes has a relatively large particle diameter of up to several micrometer (μm). Furthermore, the perovskite-type composite metal oxide sometimes undergoes grain growth during use thereof, resulting in a small surface area.

Accordingly, the present invention provides a perovskite-type composite metal oxide-based exhaust gas purifying catalyst, which has an excellent performance in terms of maximum purification percentage and/or catalytic activity at a relatively high temperature, and is able to prevent the perovskite-type composite metal oxide from undergoing grain growth during use of the exhaust gas purifying catalyst.

DISCLOSURE OF THE INVENTION

The exhaust gas purifying catalyst of the present invention comprises a porous silica support comprising silica having a pore structure, and a perovskite-type composite metal oxide particle supported in the pore structure of the porous silica support. In the exhaust gas purifying catalyst of the present invention, the peak attributable to the space between silica primary particles is in the range of 3 to 100 nm, particularly from 5 to 50 nm, more particularly from 5 to 30 nm, still more particularly from 8 to 20 nm in the pore distribution of the porous silica support. For example, the peak attributable to the pore structure of silica is in the range of from 1 to 5 nm or from 2 to 4 nm in the pore distribution of the porous silica support.

In one embodiment of the exhaust gas purifying catalyst of the present invention, the perovskite-type composite metal oxide is a perovskite-type composite metal oxide having the following formula:

$$ABO_{3-x}$$

(wherein A is selected from the group consisting of lanthanum La, strontium Sr, cerium Ce, barium Be, calcium Ca and a combination thereof; B is selected from the group consisting of cobalt Co, iron Fe, nickel Ni, chromium Cr, manganese Mn, magnesium Mg and a combination thereof; O is oxygen; and $-0.2 \leq x \leq 0.2$).

In one embodiment of the exhaust gas purifying catalyst of the present invention, the perovskite-type metal oxide has a composition of $LaFeO_3$.

BEST MODE FOR CARRYING OUT THE INVENTION

Figure 1:
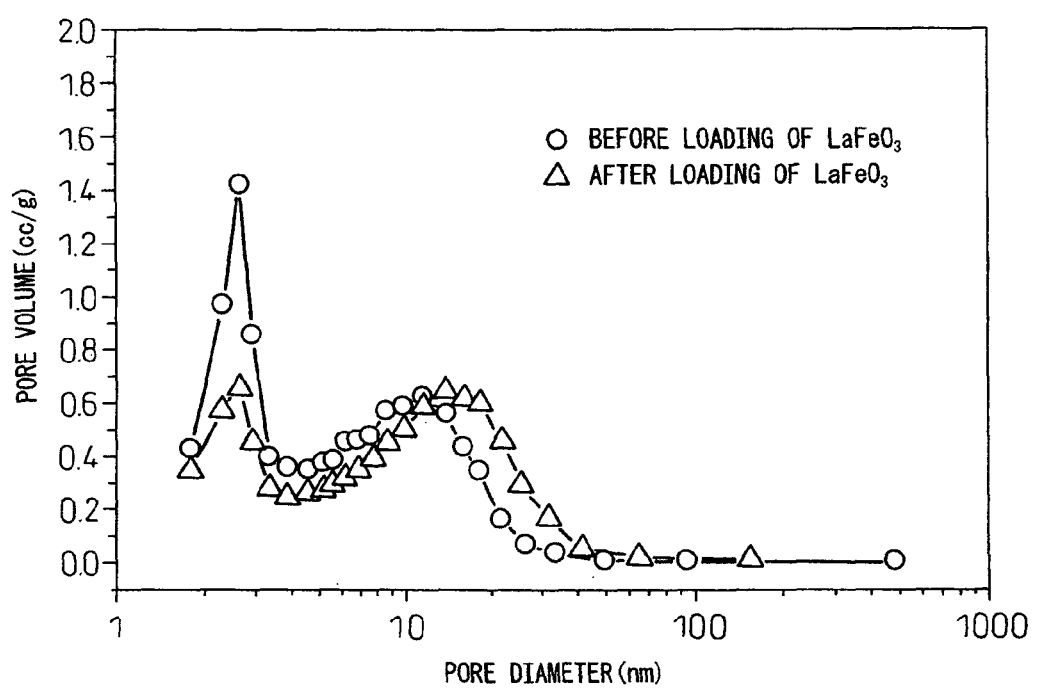
FIG. 1 is a view showing the pore volume distribution of the porous silica support before and after loading the perovskite-type composite metal oxide on the porous silica support in Example.

As described above, the conventional perovskite-type composite metal oxide catalyst does not necessarily provide good results in terms of the maximum $NO_x$ purification percentage, i.e., the $NO_x$ purification percentage at high temperatures.

This is believed to be because, in the conventional perovskite-type composite metal oxide catalyst, $NO_x$ does not tend to adsorb to the surface of the perovskite-type composite metal oxide under the low $NO_x$ concentration and/or high temperature conditions, and therefore the adsorption of $NO_x$ to the perovskite-type composite metal oxide becomes a rate-determining step, as a result, the perovskite-type composite metal oxide cannot sufficiently exert a catalytic activity.

Even in the case of loading a perovskite-type composite metal oxide particle on a normal alumina that has been used in conventional exhaust gas purifying catalysts, it is believed that the perovskite-type composite metal oxide migrates on the surface of such an alumina support to be sintered, and thereby the reduction in the $NO_x$ adsorbability of the perovskite-type composite metal oxide is not sufficiently compensated under the low $NO_x$ concentration and/or high temperature conditions.

Furthermore, even in the case of loading a perovskite-type composite metal oxide particle in a pore structure of a normal porous silica support that has been used in conventional exhaust gas purifying catalysts, it is believed that contact between the perovskite-type composite metal oxide particle supported in the pore structure and the exhaust gas is not successfully achieved, and thereby the reduction in the $NO_x$ adsorbability of the perovskite-type composite metal oxide is not sufficiently compensated under the low $NO_x$ concentration and/or high temperature conditions.

The exhaust gas purifying catalyst of the present invention comprises a porous silica support comprising silica having a pore structure, and a perovskite-type composite metal oxide particle supported in the pore structure of the porous silica support. In the exhaust gas purifying catalyst of the present invention, the peak attributable to the space between silica primary particles is in the range of 3 to 100 nm in the pore distribution of the porous silica support.

Incidentally, the pore distribution as used in the present invention means a distribution of the pore diameter measured by a nitrogen adsorption method and the volume thereof.

According to the exhaust gas purifying catalyst of the present invention, unlike a general perovskite-type composite metal oxide catalyst, an excellent exhaust gas purifying performance can be provided even at a relatively high temperature.

This is believed to be because the perovskite-type composite metal oxide particle is supported in the pore structure of the porous silica particle, and thereby the perovskite-type composite metal oxide particle is prevented from being sintered. Although not bound by any theory, it is believed that, in the case of a perovskite-type composite metal oxide particle maintained in such a very fine state, the property of the surface rather than bulk dominates and thereby a specific site having strong tendency to adsorb $NO_x$ is formed on the surface of the perovskite-type composite metal oxide.

Furthermore, it is believed that, because the peak attributable to the space between silica primary particles is in the range of 3 to 100 nm in the pore distribution of the porous silica support having a pore structure, i.e. because the porous silica support has a relatively small primary particle, the exhaust gas easily access to the perovskite-type composite metal oxide particle supported in the pore structure of the porous silica support, and thereby the small $NO_x$ adsorbability of the perovskite-type composite metal oxide can be compensated at high temperatures. For these reasons, the advantageous effects above are considered to be brought about.

<Porous Silica Support Having High External Surface Area>

The porous silica support used in the exhaust gas purifying catalyst of the present invention comprises silica having a pore structure. In the pore distribution of this porous silica support, the peak attributable to the space between silica primary particles is in the range of 3 to 100 nm, and the peak attributable to the pore structure is, for example, in the range of 1 to 5 nm.

Incidentally, the pore structure of silica as used in the present invention means regularly oriented molecular-level pores formed by silicon and oxygen atoms constituting silica.

Such a silica support can be obtained by allowing an alkylamine to self-orient in an aqueous medium, adding an alkoxysilane and an optional base to the solution, precipitating a silica support precursor in the periphery of the self-oriented alkylamine used as a template, and firing the precursor. The alkylamine and alkoxysilane used in this method can be selected according to the primary particle diameter, pore distribution or the like of the intended silica support. For example, in this method, it is possible to use an aqueous ethanol solution as the aqueous solvent, hexadecylamine as the alkylamine, tetraethoxysilane as the alkoxysilane, and ammonia as the optional base.

<Perovskite-Type Composite Metal Oxide Particle>

As the perovskite-type composite metal oxide used in the exhaust gas purifying catalyst of the present invention, any perovskite-type composite metal oxide may be used.

The perovskite-type composite metal oxide used in the exhaust gas purifying catalyst of the present invention includes a perovskite-type composite metal oxide having the following formula, particularly a perovskite-type metal oxide having a composition of $LaFeO_3$:

$$ABO_{3-x}$$

(wherein A is selected from the group consisting of lanthanum La, strontium Sr, cerium Ce, barium Ba, calcium Ca and a combination thereof; B is selected from the group consisting of cobalt Co, iron Fe, nickel Ni, chromium Cr, manganese Mn, magnesium Ma and a combination thereof; O is oxygen; and $-0.2 \leq x \leq 0.2$).

x is from $-0.2$ to $0.2$ as above. For example, in the case where A contains 0.4 of Sr which becomes a divalent ion in an oxide, an oxygen defect is produced and x becomes 0.2, and in the case where B contains Mn, a peroxidized state is produced and x becomes $-0.2$.

In the perovskite-type composite metal oxide above, a part of the metal element A or B may be partially replaced by another metal, for example may be replaced by a noble metal.

The particle of the perovskite-type metal oxide may have an average particle diameter of 10 nm or less, particularly 5 nm or less.

The amount of the perovskite-type composite metal oxide supported on the porous silica support may be selected from the range where the particle growth of the perovskite-type composite metal oxide can be suppressed and at the same time, a sufficient performance for exhaust gas purification can be provided. Accordingly, this supported amount partially depends on the external surface area of the porous silica support. For example, the amount to be supported is, in terms of the metal A or B constituting the perovskite-type composite metal oxide ($ABO_3$), from 1 to 10 mass %/g-porous silica support, e.g. 5 mass %/g-porous silica powder.

Loading of the perovskite-type composite metal oxide on the porous silica support can be achieved by impregnating the porous silica support with a solution of salts of metals constituting the perovskite-type composite metal oxide, and drying and firing the obtained porous silica support. The salts of metals constituting the perovskite-type composite metal oxide include an inorganic acid salt such as nitrate and hydrochloride, and an organic acid salt such as acetate.

Removal and drying of the solvent from the salt solution may be performed by any method and at any temperature. This can be achieved, for example, by placing the salt solution-impregnated porous silica support in an oven at 120° C. After removing and drying the solvent, the porous silica support is fired, and thereby the catalyst support particle used in the present invention can be obtained. The firing may be performed at a temperature generally employed in the synthesis of a metal oxide, for example at a temperature of 500 to 1,100° C.

<Exhaust Gas Purifying Catalyst of the Invention>

In the exhaust gas purifying catalyst of the present invention, a noble metal such as platinum, rhodium or palladium, and/or an $NO_x$ storage element, i.e. an element selected from the group consisting of an alkali metal and an alkaline earth metal, particularly lithium and barium, may be further supported.

Loading of the noble metal and $NO_x$ storage element in the exhaust gas purifying catalyst of the present invention may be performed by any method. For example, in the case of loading platinum in the exhaust gas purifying catalyst of the present invention, this may be attained by absorbing, into the catalyst, a solution containing a salt and/or a complex of platinum, for example an aqueous dinitrodiammine platinum solution, and then drying and firing the catalyst. The amount of platinum supported in the exhaust gas purifying catalyst of the present invention may be from 0.01 to 5 mass %, particularly from 0.1 to 2 mass %, based on the porous silica support.

The exhaust gas purifying catalyst of the present invention may be used not only by shaping the catalyst itself, but also by coating it on a monolithic substrate, e.g. a ceramic honeycomb substrate.

The present invention is described in greater detail below based on examples, but the present invention is not limited thereto.

Example

<Synthesis of Porous Silica Support>

Ethanol and distilled water were mixed in a ratio of 1:1 to obtain an aqueous ethanol solution. In this aqueous ethanol solution, 0.5 mol/L of hexadecylamine was dissolved. The resulting aqueous solution was stirred over 2 hours, and thereby hexadecylamine was self-assembled. Next, tetraethoxysilane and aqueous ammonia were added to the solution wherein hexadecylamine was self-assembled, and the pH of the solution was adjusted to 9.5.

In this solution, tetraethoxysilane was hydrolyzed over 30 hours and silica was precipitated in the periphery of the assembled hexadecylamine, and thereby a secondary particle comprising a primary particle having a nano-size pore was formed. Subsequently, this aqueous solution was adjusted to a pH of 7 by adding a small amount of nitric acid thereto, and the secondary particles were further aggregated and aged over 1 hour to obtain a porous silica support precursor.

Thereafter, the obtained porous silica support precursor was washed with aqueous ethanol, filtered, dried and fired in air at 800° C. over 2 hours to obtain a porous silica support used in the present invention.

<Coating of Porous Silica Support on Honeycomb Substrate>

100 Parts of the porous silica support obtained above, 30 parts of SNOWTEX OS (acidic silica sol, produced by Nissan Chemicals Industries, Ltd.), and 80 parts of water were mixed, and the obtained mixture was milled over 1 hour to obtain a slurry. A honeycomb substrate was dipped in the obtained slurry and thereby coated. The amount of the coating was 50 g/L-substrate.

<Loading of Perovskite-Type Composite Metal Oxide ($LaFeO_3$)>

A salt solution comprising 0.5 mol/L of lanthanum nitrate, 0.5 mol/L of iron nitrate and 1.2 mol/L of citric acid dissolved therein was prepared. The above honeycomb substrate coated with the porous silica support was dipped in the prepared salt solution, and thereby lanthanum ion and iron ion were supported in the pore structure of the porous silica support.

The obtained honeycomb substrate was dried in flowing air at 120° C., then fired at 500° C. over 1 hour, and then further fired at 800° C. over 2 hours. The amount of the perovskite-type composite metal oxide ($LaFeO_3$) supported was, in terms of iron (Fe), about 5 mass % based on the honeycomb substrate.

<Pore Evaluation>

FIG. 1 shows the pore distributions of the porous silica support (not including the substrate portion), before and after loading of the perovskite-type composite metal oxide (LaFeO$_3$). As shown in FIG. 1, the porous silica obtained by the method of Example has not only a peak in the vicinity of 2.7 nm attributable to the pore structure of silica, but also a peak over 10 nm attributable to the space between silica primary particles.

Figure 2:
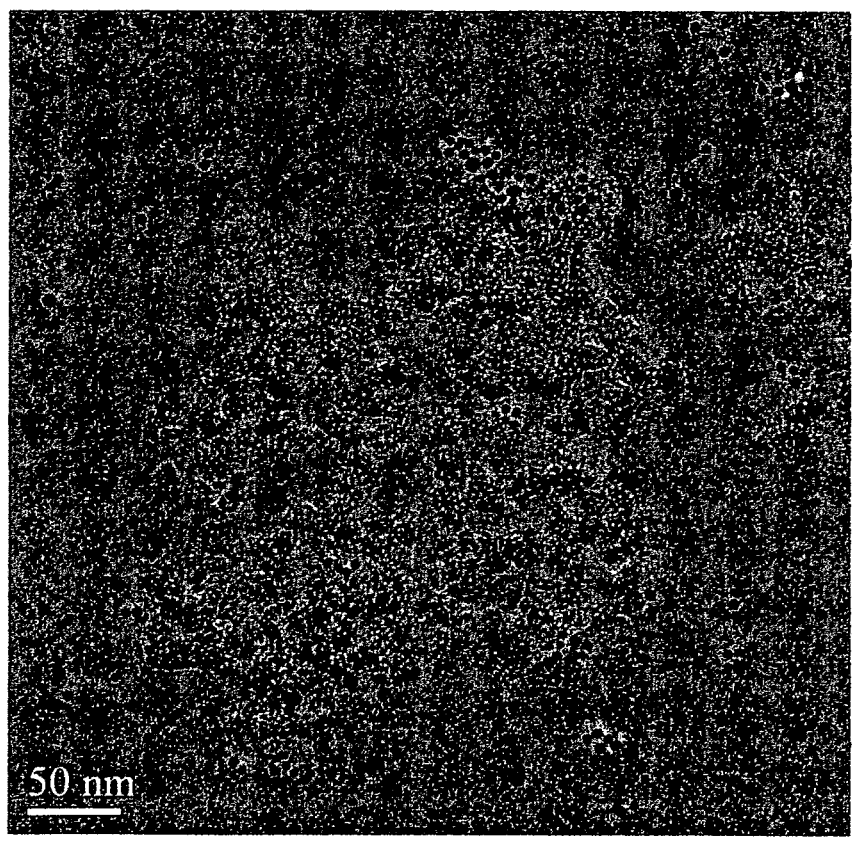
FIG. 2 is a TEM image of the porous silica support (before loading of the perovskite-type composite metal oxide) obtained in Example.

This is because, as shown in FIG. 2, the primary particle diameter of silica having a pore structure is as small as 10 to 20 nm, and these primary particles are aggregated to form a secondary particles and thereby a pore over 10 nm is provided between these primary particles. In the porous silica support obtained by the method of Example, the internal surface area was 580 m$^2$/g, and the external surface area was 280 m$^2$/g.

The "external surface area" means a surface area attributable to the space between silica primary particles, and the "internal surface area" means a surface area attributable to the pore structure of silica. The external surface area as used herein corresponds to the support's surface area easily accessed by components in the exhaust gas. For example, the internal surface area can be specifically known by determining the pore diameter and pore wall thickness in the pore structure of silica by TEM (transmission electron microscope), SEM (scanning electron microscope) or the like. Also, the external surface area can be known by subtracting the value of internal surface area from the value of entire surface area measured by a nitrogen adsorption method or the like.

Figure 4:
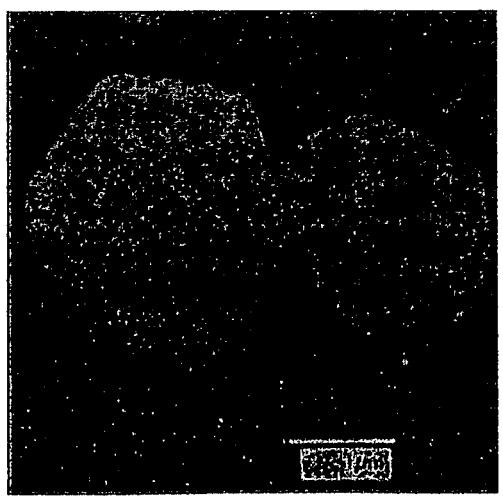
FIG. 4 is an SEM image of MCM-41 silica particle.

Incidentally, in conventional MCM-41 silica, FSM16 silica or the like, since the primary particle is in micrometer (μm) order, a pore having a pore diameter of about 10 nm is substantially not present. For example, in the case of general FSM16 silica, the internal surface area is about 800 m$^2$/g and the external surface area is 1.5 m$^2$/g. Also, for example, in the case of a general alumina catalyst support, the internal surface area is substantially not present and the external surface area is 180 m$^2$/g. For reference, FIG. 4 shows an SEM image of MCM-41 silica particle. The photograph of FIG. 4 is extracted from J. S. Beck et al., *J. Am. Chem. Soc.*, 1992, 114, 10834-10843.

As shown in FIG. 1, since the perovskite-type composite metal oxide is supported in the pore structure of silica, the pore of around 2.7 nm becomes small after loading the perovskite-type composite metal oxide. Incidentally, the pore diameter of around 10 nm corresponding to the space between silica primary particles was slightly shifted to the larger side, but there was no great change and it is understood that the perovskite-type composite metal oxide was successfully loaded.

<Evaluation of Supported State of Perovskite-Type Composite Metal Oxide>

Figure 3:
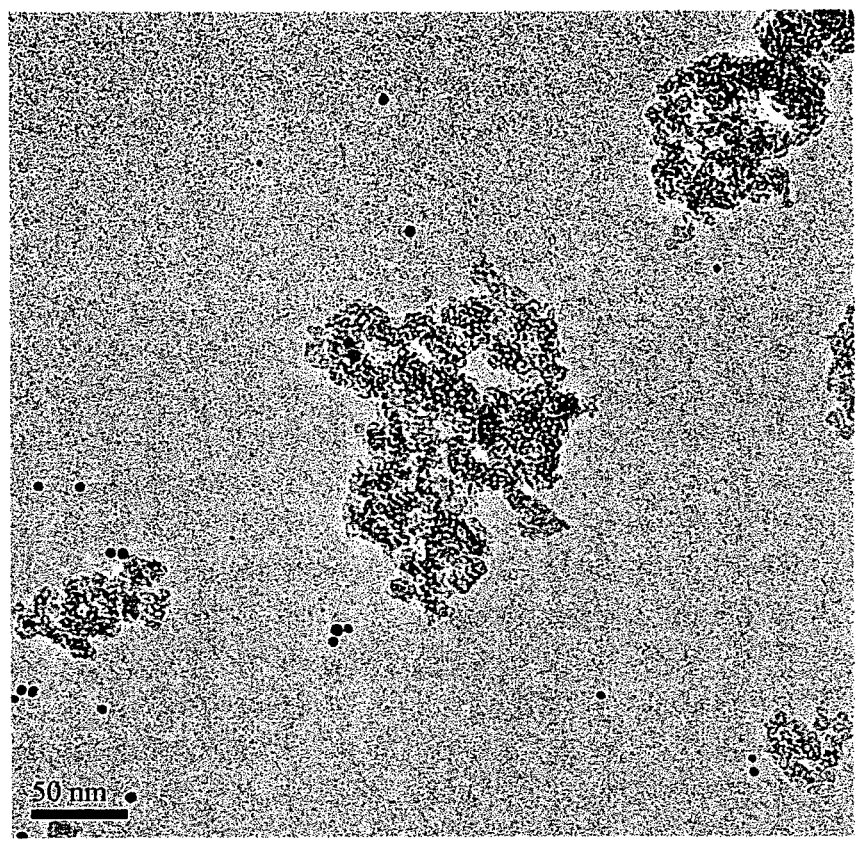
FIG. 3 is a TEM image of the porous silica support (after loading of the perovskite-type composite metal oxide) obtained in Example.

FIG. 2 shows a TEM (transmission electron microscope) image of the porous silica support before loading the perovskite-type composite metal oxide thereon, and FIG. 3 shows a TEM image of the porous silica support after loading the perovskite-type composite metal oxide thereon. In the TEM image of FIG. 3, the portion corresponding to the pore structure of silica appears more thickly than in TEM image of FIG. 2, and it is understood that the perovskite-type composite metal oxide was supported in the pore structure. Incidentally, in these TEM images of FIGS. 2 and 3, the black particle of 3 to 5 nm is gold colloid, which is mixed as a fiducial marker for a three-dimensional image.

The porous silica support having the perovskite-type composite metal oxide loaded thereon was observed using a 3D-TEM (Three-Dimensional Transmission Electron Microscope). The 3D-TEM image is obtained by reconstructing a three-dimensional (3D) structure from TEM images obtained from multiple angles. It was understood from this 3D-TEM image that a fine particle having a particle diameter of approximately from 1 to 2 nm was supported in the pore of the silica support. When the neighborhood of this particle was analyzed by EDXD (Energy Dispersive X-ray Diffraction) analysis, lanthanum (La) and iron (Fe) were detected. Therefore it is confirmed that the fine particle is an LaFeO$_3$ perovskite-type composite metal oxide particle.

Comparative Example

In Comparative Example, a perovskite-type composite metal oxide (LaFeO$_3$) was synthesized by a co-precipitation method, and the obtained perovskite-type composite metal oxide was coated on a honeycomb substrate.

<Synthesis of Perovskite-Type Composite Metal Oxide (LaFeO$_3$)>

Ammonia was added to a salt solution containing lanthanum nitrate and iron nitrate (La:Fe=1:1), and a precipitate was obtained by a co-precipitation method. The obtained precipitate was fired at 800° C. over 3 hours to obtain a perovskite-type composite metal oxide (LaFeO$_3$).

<Coating of Perovskite-Type Composite Metal Oxide (LaFeO$_3$)>

100 Parts of the thus-obtained perovskite-type composite metal oxide, 70 parts of silica sol, and 65 parts of water were mixed, and the obtained mixture was milled over 1 hour to obtain a slurry. A honeycomb substrate was dipped in the obtained slurry to be coated. The amount of the perovskite-type composite metal oxide (LaFeO$_3$) loaded was, in terms of iron (Fe), about 25 mass % based on the honeycomb substrate.

Reference Example

In Reference Example, a fine particle of lanthanum-iron-based perovskite-type composite metal oxide was loaded on the surface of a lanthanum oxide-yttrium oxide-zirconia composite metal oxide particulate support by the following modified microemulsion method in order to obtain an exhaust gas purifying catalyst. In the exhaust gas purifying catalyst obtained, a fine particle of perovskite-type composite metal oxide is densely disposed on the surface of a lanthanum oxide-yttrium oxide-zirconia composite metal oxide support particle, and therefore the composite metal oxide support particles are prevented from sintering each other during use of the catalyst.

<Preparation of Microemulsion Solution for Support>

In a 15 liter-volume reactor, 5.5 liter of cyclohexane and 0.21 kg of polyoxyethylene (n=5) nonylphenyl ether were mixed and thoroughly stirred. To the obtained solution, 0.12 liter of an aqueous solution comprising 0.144 mol of zirconium oxynitrate (ZrO(NO$_3$)$_2$), 0.0226 mol of yttrium nitrate (Y(NO$_3$)$_3$) and 0.113 mol of lanthanum nitrate (La(NO$_3$)$_3$) dissolved therein was added, and thoroughly stirred at room temperature to prepare a reverse-micelle type microemulsion (water-in-oil type microemulsion, water droplet diameter: 30 nm). In this microemulsion solution for support, the ratio between oil (organic solvent) and surfactant (O/S ratio) was 110, and the ratio between oil and water (O/W ratio) was 8.

<Preparation of Zirconium Alkoxide Solution>

A zirconium alkoxide solution was prepared by dissolving 0.145 mol of zirconium-n-butoxide in 0.2 liter of cyclohexane.

<Preparation of Microemulsion Solution for Ultrafine Particle>

After 750 ml of cyclohexane and 171 g of polyoxyethylene (n=5) nonylphenyl ether were mixed and thoroughly stirred, 60 ml of an aqueous solution comprising 0.0692 mol of lanthanum nitrate ($La(NO_3)_3$) and 0.0692 mol of ferric nitrate ($Fe(NO_3)_3$) dissolved therein was added thereto as a raw material solution of the perovskite-type composite metal oxide ultrafine particle, and then thoroughly mixed at room temperature to prepare a reverse-micelle type microemulsion solution (water-in-oil type microemulsion) having a particle diameter of 3 nm. In this microemulsion solution for ultrafine particle, the ratio between oil (organic solvent) and surfactant (O/S ratio) was 18, and the ratio between oil and water (O/W ratio) was 2.2.

<Synthesis of Composite Metal Oxide Support Precursor by Hydrolysis Reaction>

The zirconium alkoxide solution and aqueous ammonia were added while stirring to the microemulsion solution for support obtained as above, and thereby the pH of the resulting solution was adjusted to 7.5 to start hydrolysis. According to this synthesis, hydrolysis occurred in the aqueous phase of a micelle dispersed in the organic solvent or at the boundary thereof to produce a primary particle of lanthanum-yttria-zirconia composite metal oxide, and at the same time, the primary particles were aggregated to produce a secondary particle.

After 1 minute from the start of hydrolysis reaction, the microemulsion solution for ultrafine particle was added to a mixed solution of the microemulsion solution for support and the zirconium alkoxide solution, and aqueous ammonia was further added thereto to adjust the pH to 9.8. The raw material solution of the ultrafine particle in the microemulsion solution for ultrafine particle is present as a micelle having a particle diameter of about 3 nm, and this micelle collides against a micelle providing a synthesis reaction site of the support secondary particle and coalesces therewith. According to this process, through neutralization co-precipitation in the coalesced micelle, a lanthanum-iron perovskite-type composite metal oxide ultrafine particle is synthesized.

The lanthanum-iron perovskite-type composite metal oxide ultrafine particle obtained in this way is charged to the plus polarity at pH=9.8, whereas the secondary of support particle is charged to the minus polarity at this pH. Accordingly, almost as soon as the lanthanum-iron perovskite-type composite metal oxide ultrafine particle is produced, the ultrafine particle is adsorbed to the surface of a support particle (particularly a secondary particle) by an electrical action due to difference in the zeta potential therebetween. To the solution obtained as above, 9.6 liters of water was added, and then aged with stirring over about 1 hour.

Subsequently, the mother solution was separated by filtration, and the obtained precipitate was washed with ethanol three times to remove the surfactant, dried at 80° C. over one night, and then fired at 400° C. over 5 hours in air and at 800° C. over 2 hours in air to obtain an exhaust gas purifying catalyst precursor. The precursor comprises a lanthanum-yttria-zirconia composite metal oxide support, and a lanthanum-iron perovskite-type composite metal oxide ultrafine particle supported thereon. This precursor was loaded on an alumina-based monolithic substrate by a known loading method to prepare an exhaust gas purifying catalyst.

Evaluation of Exhaust Gas Purifying Performance

Regarding exhaust gas purifying catalysts of Example, Comparative Example and Reference Example, the catalyst temperature at which the $NO_x$ purification percentage reached 50% ($NO_x$ 50% purification temperature) was determined by feeding an evaluation gas having a composition shown in Table 1 below to the catalysts, and gradually raising the temperature of the evaluation gas. The lower $NO_x$ 50% purification temperature means better low-temperature activity of catalyst.

TABLE 1

| Composition of Evaluation Gas | | | | | |
|---|---|---|---|---|---|
| | $N_2$ (%) | $CO_2$ (%) | NO (ppm) | CO (ppm) | $O_2$ (%) |
| Evaluation Gas | balance | 12 | 2,500 | 6,000 | —* |

*The $O_2$ content was adjusted to give an evaluation gas having the theoretical air-fuel ratio.

The $NO_x$ 50% purification temperature is shown in Table 2 below.

TABLE 2

| 50% Purification Temperature | | | |
|---|---|---|---|
| | Example | Comparative Example (co-precipitation method) | Reference Example (modified ME method) |
| 50% Purification temperature (° C.) | 319.0 | 429.3 | 307.0 |

With respect to the $NO_x$ 50% purification temperature showing the low-temperature activity of three-way catalytic reaction, as shown in Table 2, the perovskite-type composite metal oxide catalyst of Example of the present invention has a $NO_x$ 50% purification temperature lower than that of the perovskite-type composite metal oxide obtained by a conventional co-precipitation method (Comparative Example). As shown in Table 2, the perovskite-type composite metal oxide catalyst of Example of the present invention has, despite being produced by a relatively simple production method, a $NO_x$ 50% purification temperature close to that of the perovskite-type composite metal oxide catalyst produced by a modified microemulsion method (modified ME method).

The $NO_x$ purification percentages at the catalyst temperature of 400° C., 450° C., 500° C., 550° C. and 600° C. were determined by raising the exhaust gas temperature even after the $NO_x$ purification percentage reached 50%. The results are shown in Table 3 below.

TABLE 3

| Purification Percentage at Various Catalyst Temperatures | | | | |
|---|---|---|---|---|
| | | Purification Percentage (%) | | |
| | | Example | Comparative Example (co-precipitation method) | Reference Example (modified ME method) |
| Catalyst Temperature (° C.) | 400 | 98.4 | 26.7 | 91.1 |
| | 450 | 99.9 | 95.6 | 96.7 |
| | 500 | 99.9 | 98.7 | 95.5 |
| | 550 | 99.9 | 98.7 | 94.8 |
| | 600 | 99.9 | 81.5 | 94.5 |

As apparent from Table 3, in the case of the conventional co-precipitated perovskite-type composite metal oxide catalyst (Comparative Example), and the perovskite-type composite metal oxide catalyst produced by the modified microemulsion method (modified ME method) (Reference Example), the $NO_x$ purification percentage decreases at a relatively high catalyst temperature of 600° C. This is believed to be because, under high-temperature conditions, $NO_x$ does not tend to adsorb to the surface of the perovskite-type composite metal oxide, and thereby the catalytic activity of the perovskite-type composite metal oxide cannot be exerted.

On the other hand, in the case of the perovskite-type composite metal oxide catalyst of Example of the present invention, the $NO_x$ purification percentage is substantially not decreased at temperatures up to 600° C., and the catalyst of Example exhibits catalytic characteristics evidently different from those of the perovskite-type composite metal oxide catalysts of Comparative Example and Reference Example.

The exhaust gas purifying catalysts of Example and Reference Example were subjected to endurance at 1,000° C. over 2 hours under a flowing evaluation gas having a composition shown in Table 1. After this endurance, an evaluation gas having a composition shown in Table 1 was fed to the catalyst, and the temperature of the evaluation gas was gradually raised to determine the $NO_x$ 50% purification temperature of the exhaust gas purifying catalysts of Example and Reference Example after endurance. From the difference between the $NO_x$ 50% purification temperature before and after endurance, the change in the $NO_x$ 50% purification temperature due to endurance was determined. The smaller value means the catalyst's better heat resistance. The results are shown in Table 4 below.

TABLE 4

Change in 50% Purification Temperature due to Endurance

| | Example | Comparative Example (co-precipitation method) | Reference Example (modified ME method) |
|---|---|---|---|
| Change in 50% purification temperature (° C.) | 23.2 | — | 35.5 |

As apparent from Table 4, it is understood that the exhaust gas purifying catalyst of Example of the present invention has, despite being produced by a relatively simple production method, better heat resistance than the perovskite-type composite metal oxide catalyst produced by a modified microemulsion method (modified ME method) (Reference Example).

The invention claimed is:

1. An exhaust gas purifying catalyst, wherein the catalyst comprises a porous silica support comprising silica having a pore structure, and a perovskite-type composite metal oxide particle supported in the pore structure of said porous silica support;
   wherein a peak attributable to a space between silica primary particles is in the range of 5 to 50 nm and a peak attributable to the pore structure of silica is in the range of 1 to 5 nm in the pore distribution of said porous silica support;
   wherein said perovskite-type composite metal oxide is a perovskite-type composite metal oxide having the following formula:

$ABO_{3-x}$ 

wherein A is selected from the group consisting of lanthanum La, strontium Sr, cerium Ce, barium Ba, calcium Ca and a combination thereof; B is selected from the group consisting of cobalt Co, iron Fe, nickel Ni, chromium Cr, manganese Mn, Magnesium Mg and a combination thereof; O is oxygen; and $-0.2 \leq x \leq 0.2$; and
   wherein said perovskite-type composite metal oxide is supported in an amount of 1 to 10 mass %/g-porous silica support in terms of the metal B constituting the perovskite-type composite metal oxide.

2. The exhaust gas purifying catalyst according to claim 1, wherein said peak attributable to the space between silica primary particles is in the range of 5 to 30 nm.

3. The exhaust gas purifying catalyst according to claim 1, wherein a peak attributable to the pore structure of silica is in the range of 2 to 4 nm in the pore distribution of said porous silica support.

4. The exhaust gas purifying catalyst according to claim 1, wherein said perovskite-type metal oxide has a composition of $LaFeO_3$.

5. The exhaust gas purifying catalyst according to claim 1, wherein said perovskite-type metal oxide particle has an average particle diameter of 10 nm or less.

6. The exhaust gas purifying catalyst according to claim 5, wherein said perovskite-type metal oxide particle has an average particle diameter of 5 nm or less.

7. An exhaust gas purifying catalyst, comprising:
   a porous silica support, wherein the porous silica support comprises silica primary particles having a pore structure; and
   a plurality of perovskite-type composite metal oxide particles supported in the pore structure of said porous silica support,
   wherein, in the pore distribution of said porous silica support, a first peak attributable to a space between the silica primary particles is in the range of 5 to 50 nm, and a second peak attributable to the pore structure of the silica primary particle is in the range of 1 to 5 nm,
   wherein said perovskite-type composite metal oxide is a perovskite-type composite metal oxide having the following formula:

$ABO_{3-x}$ 

wherein A is selected from the group consisting of lanthanum La, strontium Sr, cerium Ce, barium Ba, calcium Ca and a combination thereof; B is selected from the group consisting of cobalt Co, iron Fe, nickel Ni, chromium Cr, manganese Mn, Magnesium Mg and a combination thereof; O is oxygen; and $-0.2 \leq x \leq 0.2$; and
   wherein said perovskite-type composite metal oxide is supported in an amount of 1 to 10 mass %/g-porous silica support in terms of the metal B constituting the perovskite-type composite metal oxide.

8. An exhaust gas purifying catalyst according to claim 7, wherein, in the pore distribution of said porous silica support, the first peak attributable to the space between the silica primary particles is in the range of 8 to 20 nm.

9. An exhaust gas purifying catalyst according to claim 7, wherein, in the pore distribution of said porous silica support, the second peak attributable to the pore structure of the silica primary particle is in the range of 2 to 4 nm.

* * * * *